(12) United States Patent
Maeda et al.

(10) Patent No.: US 6,320,699 B1
(45) Date of Patent: Nov. 20, 2001

(54) ABERRATION CORRECTING APPARATUS AND OPTICAL APPARATUS USING THE SAME

(75) Inventors: Takanori Maeda; Ikuya Kikuchi, both of Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/501,309

(22) Filed: Feb. 10, 2000

(30) Foreign Application Priority Data

Feb. 12, 1999 (JP) .................................................. 11-033585

(51) Int. Cl.$^7$ .............................. G02B 27/14; G11B 7/00
(52) U.S. Cl. ........................ 359/637; 359/648; 359/738; 359/741; 359/743; 359/831; 359/832; 369/44.23; 369/44.32
(58) Field of Search .................................... 359/637, 648, 359/649, 652, 654, 720, 721, 741, 742, 743, 738, 831, 832; 369/44.32, 44.23, 44.27

(56) References Cited

U.S. PATENT DOCUMENTS

| | | | |
|---|---|---|---|
| 4,963,008 | * 10/1990 | Fijimura | 359/743 |
| 5,311,362 | * 5/1994 | Matsumoto et al. | 359/738 |
| 5,461,513 | * 10/1995 | Maruyama | 359/831 |
| 5,726,436 | * 3/1998 | Oka et al. | 359/637 |
| 5,862,001 | * 1/1999 | Sigler | 359/832 |
| 5,995,292 | * 11/1999 | McDonald | 359/637 |
| 6,055,221 | * 4/2000 | Ikegame | 369/44.23 |

* cited by examiner

Primary Examiner—Loha Ben
(74) Attorney, Agent, or Firm—Sughrue, Mion, Zinn, Macpeak & Seas, PLLC

(57) ABSTRACT

An aberration correcting apparatus and an optical pickup apparatus using this apparatus, in which a spherical aberration based on a thickness error of an optical disc substrate can be preferably eliminated and a thickness error permission range of the optical disc substrate can be widened even if an objective lens of a high numerical aperture is used. The aberration correcting apparatus is arranged on an optical axis of an optical path in an optical apparatus, the aberration correcting apparatus comprises a pair of light transmitting substrates each of which is arranged so as to intersect perpendicularly to the optical axis, wherein at least one of the light transmitting substrates is held rotatably around the optical axis, each of the light transmitting substrates has distributions of optical path lengths which mutually complementarily decrease or increase within a predetermined range on a concentric circle in which the optical axis is set to the center, and the distribution of the total optical path length of the pair of light transmitting substrates is uniformly changed within the predetermined range on the concentric circle in which the optical axis is set to the center in accordance with the rotation of the light transmitting substrate, thereby applying a phase difference to the transmitted light beam.

29 Claims, 14 Drawing Sheets

DIFFERENCE OF OPTICAL PATH LENGTH IN PUPIL

RADIAL POSITION IN PUPIL

DIFFERENCE OF OPTICAL PATH LENGTH IN PUPIL

RADIAL POSITION IN PUPIL

ABERRATION CORRECTING APPARATUS AND OPTICAL APPARATUS USING THE SAME

BACKGROUND OF THE INVENTION

1. Field of the Invention

The invention relates to an optical apparatus, and relates to an optical apparatus for use in an optical information recording/reproducing apparatus for writing and/or reading a signal to/from an optical disc used as an optical information recording medium.

2. Description of Related Art

An optical disc has an information recording surface and a transparent substrate to protect the information recording surface. Information is written or read out to or from the information recording surface of an optical disc by irradiating a laser beam onto the information recording surface through the transparent substrate.

As for the optical disc, the improvement in its recording density is being pursued. In order to write or read out information to/from the information recording surface of an optical disc having improved recording density, it is necessary to converge the laser beam to a sufficiently small beam on the information recording surface. As a method to converge the laser beam into a small beam, it is attempted to raise the numerical aperture of the objective lens. Hitherto, the numerical aperture of the objective lens has generally been equal to or about 0.45. It is now contemplated to raise the value to a range between 0.6 and 0.85.

Since the laser beam has been designed so as not to cause an aberration for a transparent substrate having a predetermined thickness, a problem was that a spherical aberration occurs when the transparent substrate has a thickness error. Particularly, when using an objective lens with a large numerical aperture, as compared with a case of using an objective lens with a small numerical aperture, it is easily influenced by the thickness error of the transparent substrate and a large spherical aberration occurs even with a small thickness error.

When reproducing an optical disc having a multilayer structure, since a thickness of light transmitting substrate differs in dependence on the layer, a problem was that the spherical aberration occurs so that it is made difficult to reproduce the signal in a preferable way. On the other hand, a method has been deviced in which a liquid crystal device divided concentrically is used, a refractive index of the concentric portion is changed by applying a voltage to the liquid crystal devices, so as to effect the correction of a spherical aberration of the optical disc having multilayer structure. Such a method is disclosed in Japanese Patent Kokai No. 10-269611.

The liquid crystal device, however, has a problem such that its response speed is low and the device cannot respond to a spherical aberration which fluctuates in one circumference of the substrate thickness of the optical disc. The problem of the occurrence of the spherical aberration occurs typically in the case where a numerical aperture of an objective lens is increased. In this case, preferable recording and reproduction cannot be performed unless thickness precision of the optical disc is set severely.

OBJECT AND SUMMARY OF THE INVENTION

The invention has been made in consideration of the problems and it is an object of the invention to provide an aberration correcting apparatus which can remove preferably a spherical aberration based on a thickness error of an optical disc substrate and widen a thickness error permission range of the optical disc substrate even if an objective lens with a high numerical aperture is used, and to also provide an optical pickup apparatus using the aberration correcting apparatus.

According to the invention, there is provided an aberration correcting apparatus which is arranged on an optical axis of an optical path in an optical pickup apparatus for irradiating a laser beam onto an optical disc, the aberration correcting apparatus comprises: a pair of light transmitting substrates each of which is arranged so as to intersect perpendicularly to the optical axis, wherein at least one of the light transmitting substrates is held to be rotatable about the optical axis, the light transmitting substrates have distributions of optical path lengths which mutually complementarily decrease or increase in a predetermined range on a concentric circle in which the optical axis is set to a center, and a distribution of the total optical path length of the pair of light transmitting substrates is changed uniformly within a predetermined range on the concentric circle in which the optical axis is set to the center in accordance with the rotation of the light transmitting substrate, thereby applying a phase difference to the transmitted laser beam.

In one aspect of the invention, the pair of light transmitting substrates have mutually complementary thicknesses, and the thickness of each light transmitting substrate gradually decreases or increases in a predetermined range on a circumference of the same radius in which the optical axis is set to the center. The term "gradually" has a meaning including both a state where the thickness changes smoothly and a state where it changes in a stairway manner.

In another aspect of the invention, the thickness of each light transmitting substrate gradually decreases or increases on the same radius vector from the optical axis.

In another aspect of the invention, the surfaces of the light transmitting substrates form mutually complementary curved surfaces so that the total thickness of the pair of light transmitting substrates is proportional to a phase deviation amount to be corrected.

In another aspect of the invention, the thickness of each light transmitting substrate is constant within a predetermined range on the same radius vector in which the optical axis is set to the center.

In another aspect of the invention, a refractive index of each light transmitting substrate is distributed so as to gradually decrease or increase in a predetermined range on a circumference of the same radius in which the optical axis is set to the center.

In another aspect of the invention, the distribution of the refractive indices gradually decreases or increases on the same radius vector from the optical axis.

In another aspect of the invention, the pair of light transmitting substrates provide a quartic phase difference onto the same radius vector from the optical axis of the transmitted laser beam.

In another aspect of the invention, the light transmitting substrates have mutually complementary distributions of refractive indices so that the total distribution of the refractive indices of the pair of light transmitting substrates is proportional to a phase deviation amount to be corrected.

In another aspect of the invention, the distribution of the refractive indices of each light transmitting substrate is constant on the same radius vector in which the optical axis is set to the center.

In another aspect of the invention, a transparent flow medium whose refractive index differs from that of the light transmitting substrate is filled in a gap between the pair of light transmitting substrates.

According to the invention, there is provided an optical pickup apparatus which writes or reads out a signal to/from an optical disc and has a light source for emitting a laser beam, an objective lens for converging the laser beam toward an information recording surface of the optical disc, an irradiating optical system for leading the laser beam to the objective lens, and a detection optical system which includes photodetecting means and leads reflection light from the information recording surface to the photodetecting means through the objective lens, the optical pickup apparatus comprises: an aberration correcting apparatus which is arranged on an optical axis of an optical path of the irradiating optical system and comprises a pair of light transmitting substrates that face each other, wherein at least one of the light transmitting substrates is held rotatably around the optical axis, the light transmitting substrates have distributions of optical path lengths which mutually complementarily and gradually decrease or increase on a circumference of a same radius in which the optical axis is set to a center, and a distribution of the total optical path length of the pair of light transmitting substrates is changed uniformly within a predetermined range on the concentric circle in which the optical axis is set to the center in accordance with the rotation of the light transmitting substrate, thereby applying a phase difference to the transmitted laser beam; and aberration correction driving means which includes optical disc thickness detecting means for generating an output corresponding to a thickness change amount of the optical disc, rotates the light transmitting substrate in accordance with the output, and minimizes a spherical aberration that is given to the transmitted laser beam by the transparent substrate of the optical disc.

In an aberration correcting apparatus in the optical pickup apparatus according to the invention, the pair of light transmitting substrates having the distributions of the optical path lengths which mutually complementarily and gradually decrease or increase on the circumference of the same radius in which the irradiation optical axis is set to the center are arranged on the optical axis so that the thicknesses or refractive indices are made different complementarily and partially, and one of the light transmitting substrates is rotated around the optical axis, thereby partially varying the total optical path length of the pair of light transmitting substrates through which the laser beam passes, partially giving a predetermined phase difference distribution to the transmitted light, and correcting the spherical aberration. Since the spherical aberration is corrected merely by rotating one of the light transmitting substrates, it is also possible to cope with a thickness error which changes during one rotation of the disc.

DETAILED DESCRIPTION OF THE PREFERRED EMBODIMENTS

Embodiments of the invention will now be described hereinbelow with reference to the drawings.

First, an optical pickup apparatus for writing and/or reading out a signal to/from an information recording surface of an optical disc by irradiating a laser beam onto the optical disc will be described with reference to FIG. 1.

An optical pickup apparatus of a recording/reproducing apparatus for loading an optical disc 5 such as optical video disc, digital audio disc, or the like and recording and/or reproducing information has what are called a focusing servo and a tracking servo for always converging a laser beam accurately to a pit train or the like formed spirally or concentrically on an information recording surface of the optical disc.

The optical pickup apparatus is constructed mainly by an objective lens unit and a main unit to support it. The main unit is fixed to a slider mechanism which moves on a shaft that is extended in the radial direction of the optical disc 5.

Figure 1:
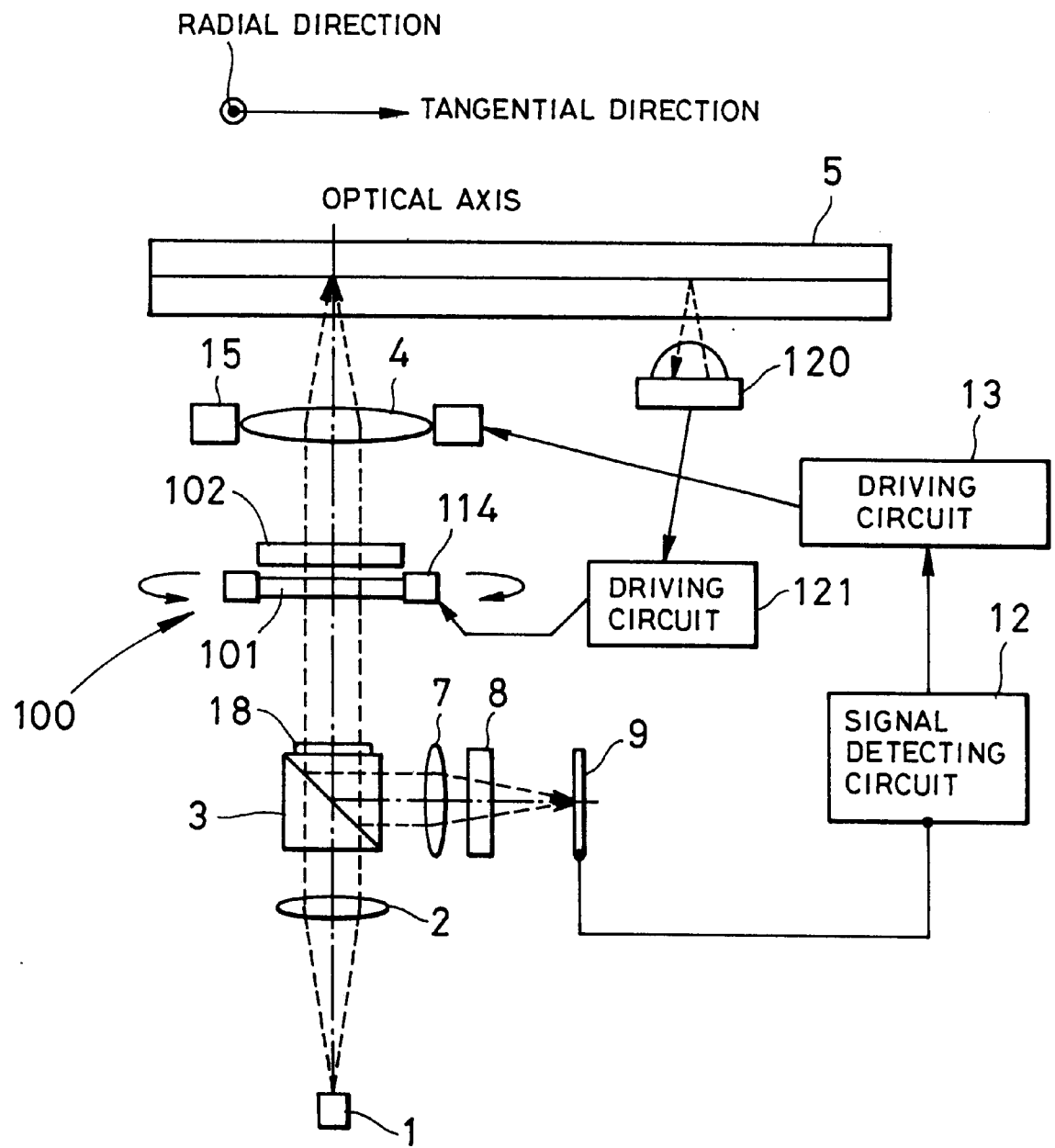
FIG. 1 is a schematic constructional diagram of an embodiment of the optical pickup apparatus.

As shown in FIG. 1, the objective lens unit has an objective lens driving mechanism 15 such as an actuator for driving an objective lens 4 in the radial direction and the focusing direction of the optical disc in order to converge a laser beam toward the information recording surface of the optical disc 5. The objective lens driving mechanism 15 has a coil and a magnetic circuit to drive an objective lens holder in the radial direction and the focusing direction.

As shown in FIG. 1, the main unit has an irradiating optical system which includes a semiconductor laser 1, a collimator lens 2, a polarizing beam splitter 3, a ¼ wavelength plate 18, and the like and leads a laser beam from the semiconductor laser to the objective lens. The main unit further has a detection optical system which includes the polarizing beam splitter 3, a condenser lens 7 for detection, an astigmatism generating device 8 such as cylindrical lens, multilens, or the like, and the like and leads the laser beam from the semiconductor laser to photodetecting means such as a photodetector 9 divided into, for example, four parts by two line segments which perpendicularly cross each other.

A pair of first and second correcting plates 101 and 102 having mutually complementary curved surfaces which face each other with a distance are arranged between the polarizing beam splitter 3 and objective lens 4 of the irradiating optical system in a manner such that a rotary shaft of the correcting plate coincides with an optical axis of the irradiating optical system. The first correcting plate 101 is held rotatably around the optical axis by aberration correction driving means 114.

The aberration correction driving means includes an actuator 114, a thickness detection photodetector 120, and a driving circuit 121. The thickness detection photodetector 120 generates an output signal corresponding to a change amount of the optical disc thickness and supplies it to the driving circuit 121. The driving circuit 121 rotates the first correcting plate 101 in response to a thickness error signal, thereby minimizing a spherical aberration which is applied to the transmitted laser beam by a transparent substrate of the optical disc.

The operation of the optical pickup will now be described. As shown in FIG. 1, the linear polarization laser beam emitted from the semiconductor laser 1 passes through the collimator lens 2, is shaped by the polarizing beam splitter 3, is circularly polarized by the ¼ wavelength plate 18, and is directed to the objective lens 4. The laser beam passes through the first and second correcting plates 101 and 102 of the aberration correcting apparatus, which will be explained hereinlater, and a predetermined optical path length difference distribution is applied to the transmitted laser beam. The laser beam is subsequently converged by the objective lens 4, thereby forming a light spot onto the recording surface of the optical disc 5. The spherical aberration is set off by the transparent substrate of the optical disc 5. The reflection light from the light spot passes through the objective lens 4 and the first and second correcting plates 101 and 102 of the aberration correcting apparatus, is linearly polarized by the ¼ wavelength plate 18, is reflected by dielectric multilayer films of the polarizing beam splitter 3, is separated to the condenser lens 7 for detection, and enters the photodetector 9 via the multilens 8. The multilens 8 irradiates a light spot of a true circle to the 4-split photodetector 9 in an in-focus state of the laser beam converged onto the recording surface of the optical disc 5. In an out-of-focus state, the multilens 8 causes what is called an astigmatism such that an elliptic light spot is irradiated to the photodetector 9 in the diagonal direction of the element.

The photodetector 9 photoelectrically converts the portion of the light spot irradiated onto each of the four photosensing surfaces to an electric signal in accordance with an intensity of the light spot and supplies it to a signal detecting circuit 12. The signal detecting circuit 12 generates a focusing error signal and a tracking error signal on the basis of the electric signals which are supplied from the photodetector 9 and supplies them to a driving circuit 13. The driving circuit 13 supplies each driving signal to the actuator 15. The actuator 15 moves the objective lens 4 in the corresponding direction in accordance with each driving signal. Since the aberration is always corrected by the aberration correcting apparatus, the aberration which the whole optical system in a range from a light source to the optical disc can be almost minimized as a whole so that the spherical aberration and the optical path length difference are mutually set off. Besides an ordinary electromagnetic actuator using a winding coil according to the embodiment, various constructing methods such that an actuator using a piezoelectric transducer is used, an ultrasonic motor is used, and the like are possible.

In the optical system including the objective lens of the optical pickup, in order to record or reproduce a signal, the laser beam is irradiated onto the information recording surface of the optical disc through a transparent optical disc substrate having a predetermined thickness. The optical system is designed so as to form a diffraction limit spot onto the recording surface of the optical disc when the thickness of transparent optical disc substrate has the predetermined value. If the thickness of substrate is deviated from the predetermined value, an out-of-focus and a spherical aberration occur. It is assumed that the out-of-focus is corrected automatically by a focusing mechanism of the pickup.

The first embodiment of the aberration correcting apparatus of the invention will now be described with reference to FIG. 2.

Figure 2:
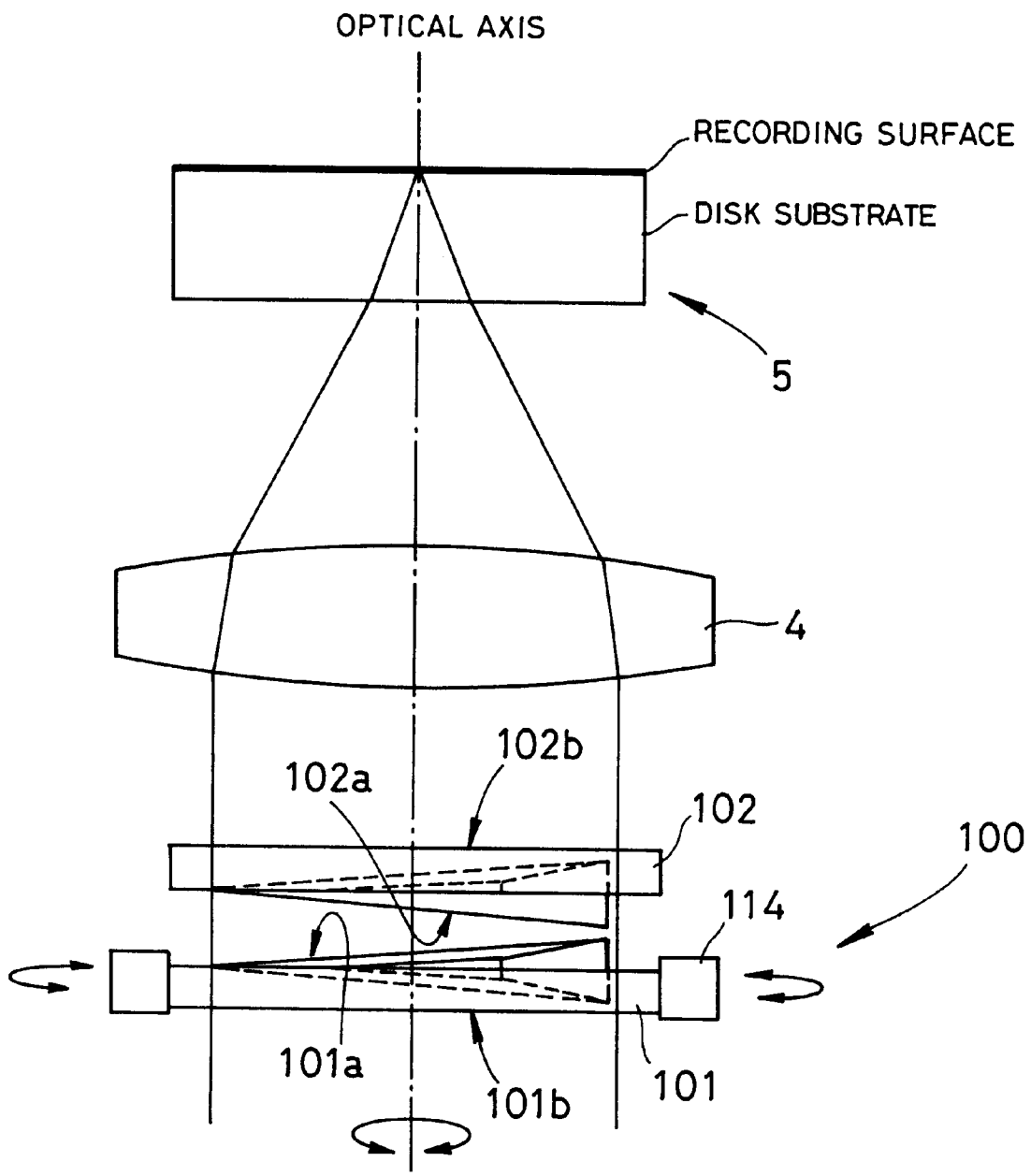
FIG. 2 is a schematic cross-sectional view of an aberration correcting apparatus in the embodiment of the optical pickup apparatus.

An aberration correcting apparatus 100 of the first embodiment shown in FIG. 2 is arranged in the optical pickup apparatus for writing and/or reading out the signal to/from the optical disc, namely, in an optical path of the laser beam which is emitted from the semiconductor laser and reaches the optical disc 5. For example, the aberration correcting apparatus 100 is arranged between the collimator lens and the objective lens 4. The aberration correcting apparatus 100 comprises the first correcting plate 101 and the second correcting plate 102. The first and second correcting plates 101 and 102 have mutually complementary curved surfaces 101a and 102a which face each other with a distance. The two first and second correcting plates 101 and 102 are overlapped and arranged with a distance so that the complementary curved surfaces are not come into contact with each other. The first and second correcting plates 101 and 102 are light transmitting substrates such as glass plates in which partial thicknesses from flat surfaces 101b and 102b on the opposite side of the curved surfaces of the inner surfaces are different and are arranged in a manner such that the flat surfaces are arranged perpendicularly to the optical axis of the laser beam in the pickup, respectively. Center axes of both first and second correcting plates 101 and 102 coincide with the optical axis of the laser beam. The pair of correcting plates are formed so that positive and negative polarities of change ratios of the plate thicknesses on the same radius in which the optical axis of the laser beam is set to a center are different in the curved surface portions. Between them, the second correcting plate 102 is fixed and the first correcting plate 101 is held and rotatable by the actuator 114 in an angle range of a predetermined angle in which the optical axis is set to the center, for example, an angle of ±0.5°. It is also possible to construct those plates in a manner such that the second correcting plate 102 is rotatable, the first correcting plate 101 is fixed, and both correcting plates are relatively rotated. It is sufficient, namely, that at least one of the correcting plates is held rotatable around the optical axis of the laser beam as a rotational axis.

The first and second correcting plates 101 and 102 have the curved surfaces 101a and 102a as complementary aspherical surfaces, and the opposite sides of the curved surfaces 101a and 102a which face each other are formed so as to become the flat surfaces 101b and 102b which are parallel with each other. Since the curved surfaces 101a and 102a are formed in a complementary relationship, if the curved surface sides of the aberration correcting apparatus 100 are overlaid, they become parallel flat plates as a whole. Since the second and first correcting plates 102 and 101 are held so that the rotary axis of the relative rotation of them coincides with the optical axis of the optical path of the laser beam, the total optical path length on both correcting plates of the transmitted laser beam uniformly changes on the concentric circle in which the optical axis is set to the center due to the relative rotation of the correcting plates.

Figure 3:
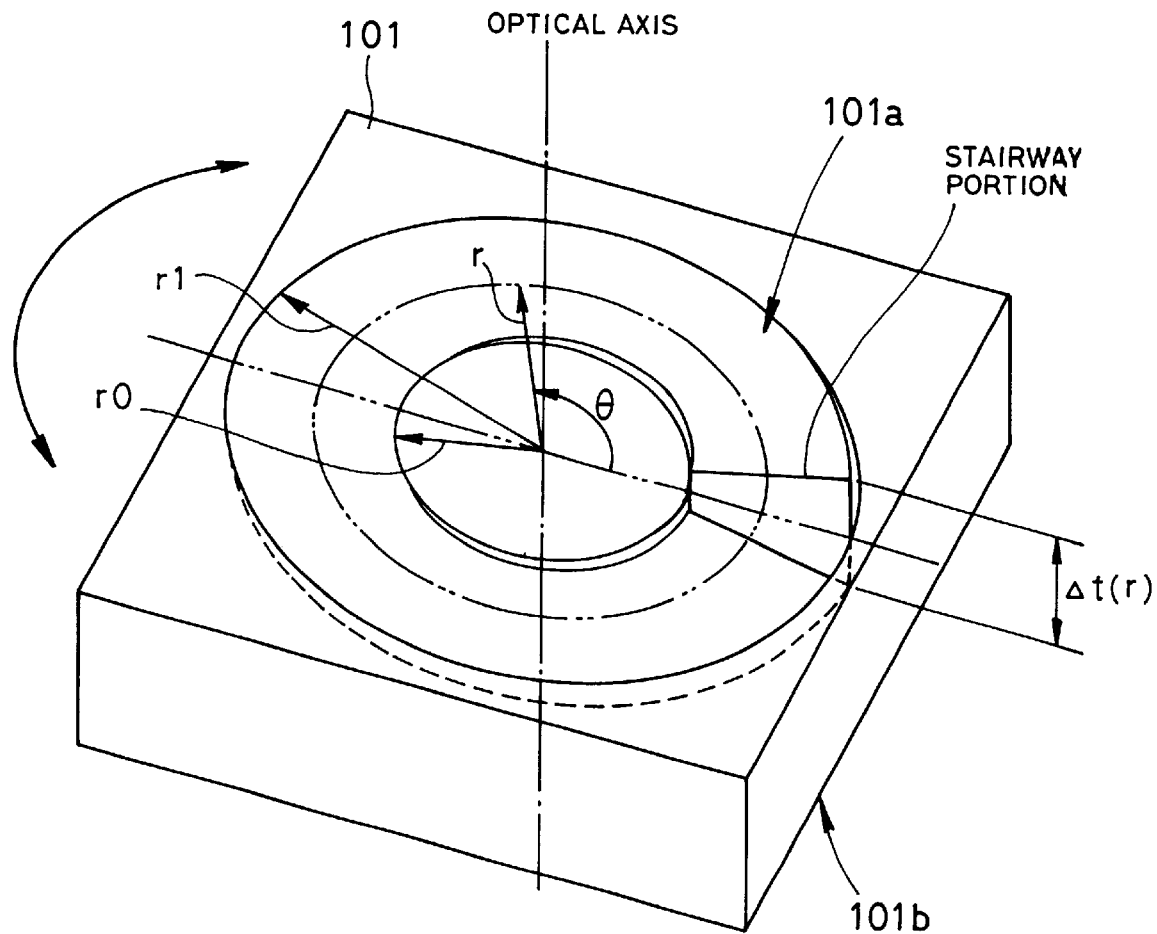
FIG. 3 is a schematic perspective view of a first correcting plate of the aberration correcting apparatus in the optical pickup apparatus of the embodiment.

FIG. 3 is a perspective view showing a surface shape of the curved surface of the first correcting plate 101 which is used in the first embodiment. The curved surface 101a is a spiral curved surface such that the thickness of correcting plate gradually decreases from the apex of a stairway portion on the circumference of the same radius in which the optical axis is set to the center. The curved surface 101a, therefore, is defined by a distribution of the plate thickness on the circumference of the same radius from the optical axis, and the optical path length of the transmitting portion of the laser beam on the same radius in which the optical axis is set to the center monotonously decreases and changes at a slope ω (refer to FIG. 5) in the circumferential direction. Further, a portion which becomes thick and a portion which becomes thin with a predetermined inclination from the optical axis as a position approaches the outermost peripheral portion side (radius $r_1$) exist on the spiral curved surface 101a. That is, the plate thickness of the curved surface of the substrate gradually decreases or increases on the same radius vector from the optical axis. The substrate shown in the diagram has a shape such that a change ratio of the thickness of center portion within a radius $r_0$ is equal to 0.

Figure 4:
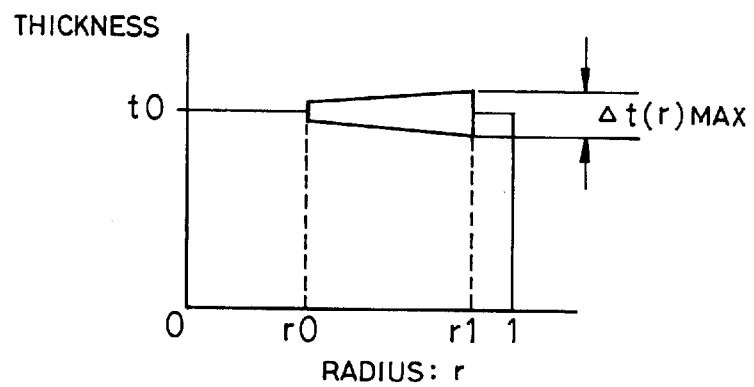
FIG. 4 is a graph showing a change in plate thickness on a radius vector of the first correcting plate of the aberration correcting apparatus in the optical pickup apparatus of the embodiment.

FIG. 4 shows the thickness of first correcting plate by the polar coordinates in the radius direction, namely, on the same radius vector. In the diagram, therefore, Δt(r)max indicates the maximum and minimum thicknesses in the circumference at the radial position, namely, a thickness difference of the stairway portion.

Figure 5:
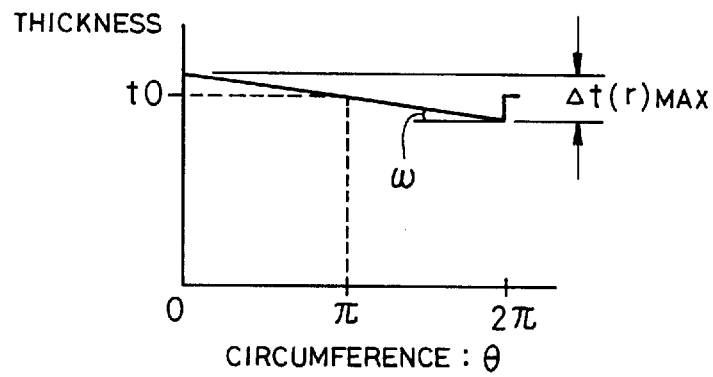
FIG. 5 is a graph showing a change in plate thickness on a circumference of the same radius of the first correcting plate of the aberration correcting apparatus in the optical pickup apparatus of the embodiment.

FIG. 5 shows the thickness of first correcting plate 101 in the circumferential direction of a certain same radius r of the curved surface 101a by the polar coordinates. The thickness at a point (r, θ) when the stairway portion shown in FIG. 3 is set to 0° and a slope ω is set negative is shown. In FIGS. 4 and 5, $t_0$ denotes a plate thickness of the portion such as a center portion or the like within the radius $r_0$, namely, the portion other than the curved surface 101a.

Figure 6:
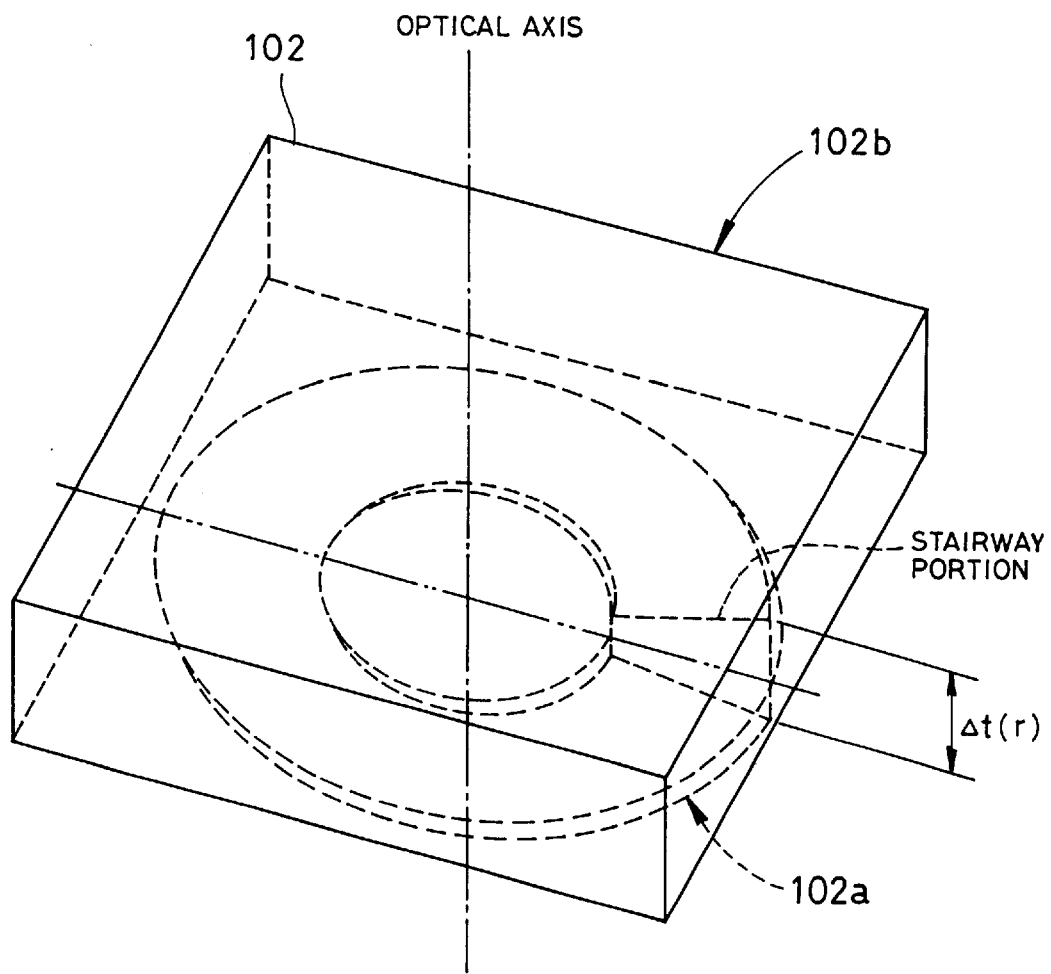
FIG. 6 is a schematic perspective view of a second correcting plate of the aberration correcting apparatus in the optical pickup apparatus of the embodiment.
Figure 7:
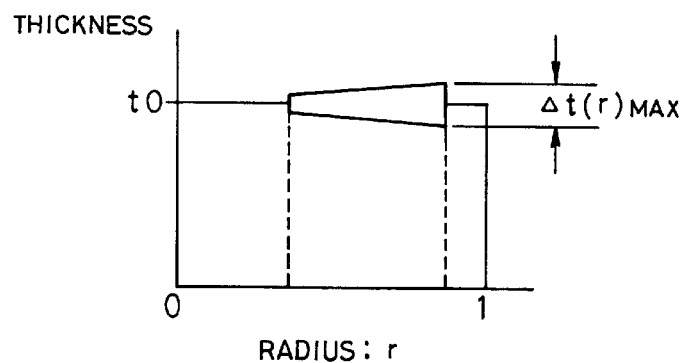
FIG. 7 is a graph showing a change in plate thickness on a radius vector of the second correcting plate of the aberration correcting apparatus in the optical pickup apparatus of the embodiment.
Figure 8:
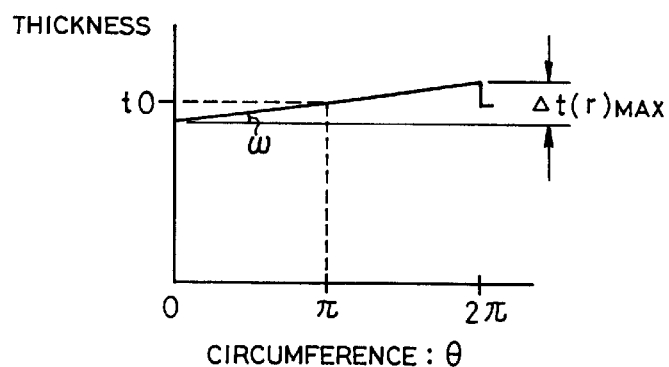
FIG. 8 is a graph showing a change in plate thickness on a circumference of the same radius of the second correcting plate of the aberration correcting apparatus in the optical pickup apparatus of the embodiment.

As shown in FIG. 6, the second correcting plate 102 which is used in the first embodiment has the complementary surface shape 102a of the curved surface 101a of the first correcting plate 101. As shown in a graph of FIG. 8, the curved surface 102a is a spiral curved surface such that the thickness of correcting plate gradually increases from the bottom of the stairway portion at the slope ω on the circumference of the same radius in which the optical axis is set to the center. In FIG. 8, a sign of a gradient of the change in plate thickness for θ is opposite to that in FIG. 5. Further, a portion which becomes thin and a portion which becomes thick with a predetermined inclination from the optical axis as a position approaches the outermost peripheral portion side exist on the spiral curved surface 102a although their positions are opposite to those in the case of the curved surface 101a. As for the curved surface 102a as well, its plate thickness also gradually decreases or increases on the same radius vector from the optical axis at the same change ratio as that of the curved surface 101a as shown in FIG. 7.

Figure 9:
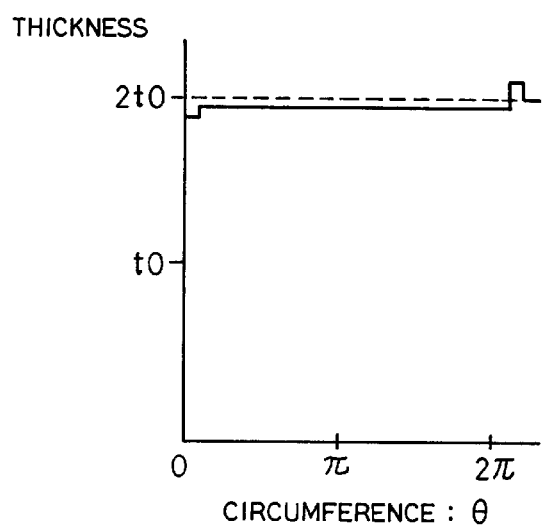
FIG. 9 is a graph showing changes In thickness of both correcting plates of the aberration correcting apparatus in the optical pickup apparatus of the embodiment.

The apparatus is constructed in a manner such that the two first and second correcting plates 101 and 102 are overlaid and arranged by using the optical axis in common and, further, the first correcting plate 101 is rotated by a predetermined angle for the second correcting plate 102 by setting the common optical axis to the center. As shown in FIG. 9, therefore, if the plate thicknesses in the circumferential direction of a certain same radius r of the first and second correcting plates 101 and 102 are shown by polar coordinates, the thickness obtained by subtracting a gap between those plates from the total plate thickness $2t_0$ of both first and second correcting plates becomes the total optical path length of the laser beam in the aberration correcting apparatus. It is constant when there is no relative rotation of both correcting plates.

Figure 10:
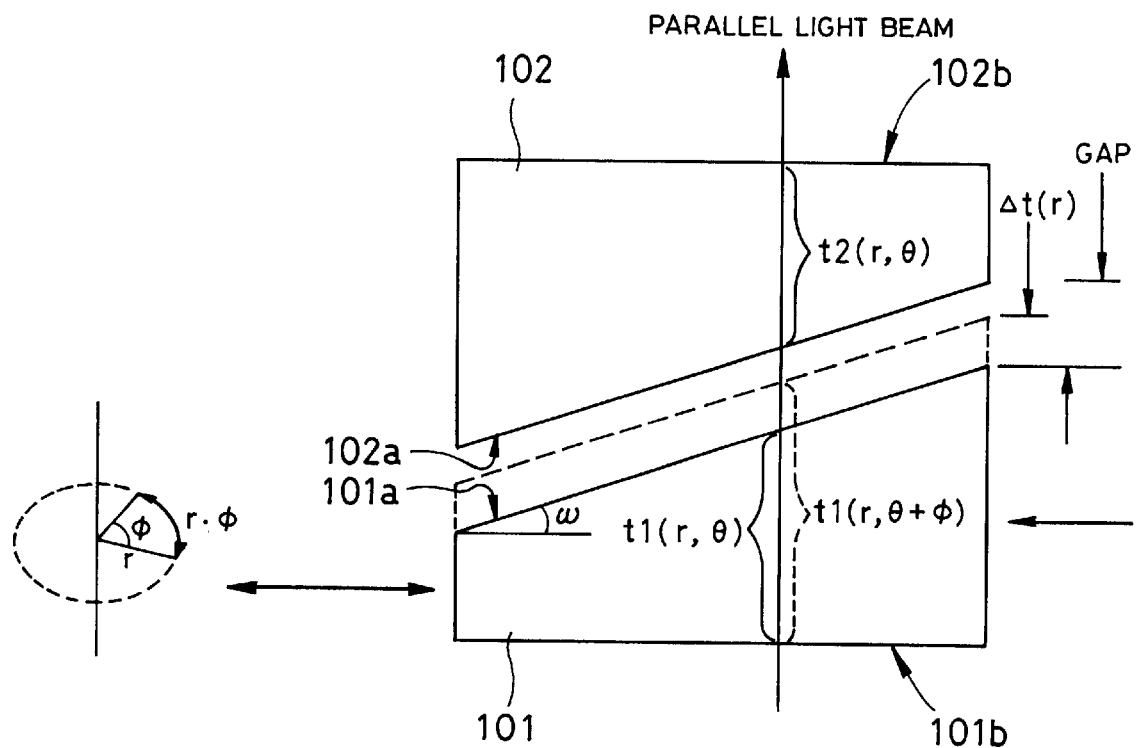
FIG. 10 is a schematic explanatory diagram showing changes in thickness due to the rotation of both correcting plates of the aberration correcting apparatus in the optical pickup apparatus of the embodiment.

The operation of the invention will now be described. It is now assumed that the thicknesses of both first and second correcting plates 101 and 102 when θ=π are equal to $t_0$ and a relative rotational angle deviation of both correcting plates is equal to φ for simplicity of explanation. As shown in FIG. 10, it is now assumed that the parallel laser beam enters the first and second correcting plates 101 and 102, and to which phase difference the wave fronts of the laser beam which passed through the correcting plates are subjected is calculated. FIG. 10 is a cross sectional view showing the plate thicknesses cut on the same circumference of the first and second correcting plates 101 and 102 including the position (r, θ).

The thicknesses $t_2(r, θ)$ and $t_1(r, θ+φ)$ of the second and first correcting plates 102 and 101 at the time when the relative rotational angle φ is given at the position (r, θ) are as follows excluding the stairway portion, respectively.

$$t_2(r, θ) = t_0 - \Delta t/2 + (θ/(2\pi))\Delta t(r)$$

$$t_1(r, θ+φ) = t_0 - \Delta t/2 - ((θ+φ)/(2\pi))\Delta t(r) \quad (1)$$

The total substrate thickness $t(r, θ)$ of the substrate where the light after transmitting the two plates passes is, therefore, $$t(r, θ) = t_2(r, θ) + t_1(r, θ + φ) \quad (2)$$

$$= 2t_0 - (φ/(2\pi))\Delta t(r)$$

As will be understood from this equation, unless the rotational angle φ is given, the total plate thicknesses of the substrates where the light transmits are equal to a predetermined value at all positions. Changes of the increase and decrease of the total plate thickness when the rotational angle φ is given can be determined by $\Delta t(r)$ in accordance with each radius. As shown in FIG. 10, since the correcting plate has a gradient of the angle ω on the radius r, $$\Delta t(r) = r \cdot φ \cdot \tan ω \quad (3)$$

The whole plate thickness, namely, the optical path length can be also changed in accordance with the gradient of the predetermined angle ω on the same radius r.

Figure 11:
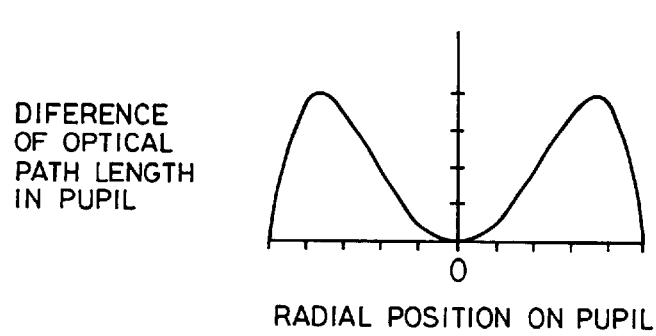
FIG. 11 is a graph showing a remaining spherical aberration amount to be corrected according to a thickness error of an optical disc substrate in the optical pickup apparatus of the embodiment.

FIG. 11 shows a quartic aberration amount in the pupil due to the spherical aberration according to the thickness error of the optical disc substrate remaining after the correction of the out-of-focus. In FIG. 11, an axis of abscissa indicates a radial position on the pupil and an axis of ordinate shows a phase difference of the generated wave fronts as a difference of the optical path lengths in which one wavelength is set to a unit. Although the optical path length does not occur in the ideal non-aberration state, FIG. 11 shows a result of the calculated numerical aperture in the case where a numerical aperture of the objective lens is set to 0.85 and an optical disc thickness of a specified value 600 μm is set to 650 μm. The change amount of the quartic aberration is proportional to the thickness error of the optical disc substrate.

Figure 12:
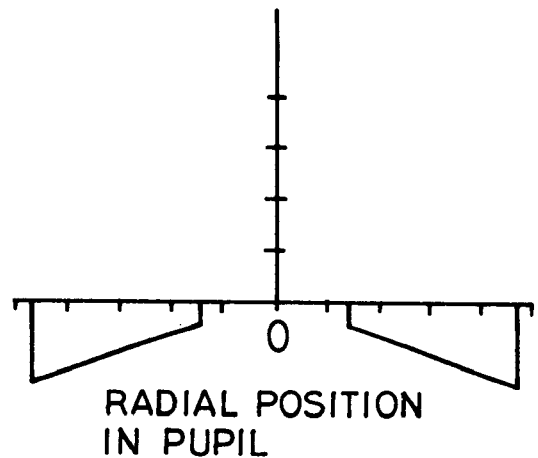
FIG. 12 is a graph showing a change in optical path length difference due to the aberration correcting apparatus in the optical pickup apparatus of the embodiment.
Figure 13:
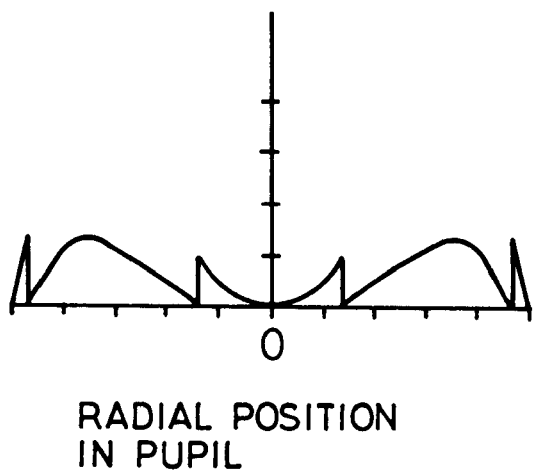
FIG. 13 is a graph showing a spherical aberration amount after the correction due to the aberration correcting apparatus in the optical pickup apparatus according to the embodiment.

If the difference of the optical path lengths due to the thickness error of the disc substrate shown in FIG. 11 is corrected by the first embodiment, since a phase difference distribution shown in FIG. 12 can be applied to the transmitted laser beam, a difference of the optical path lengths shown in FIG. 13 is obtained and the spherical aberration decreases as a result.

Figure 14:
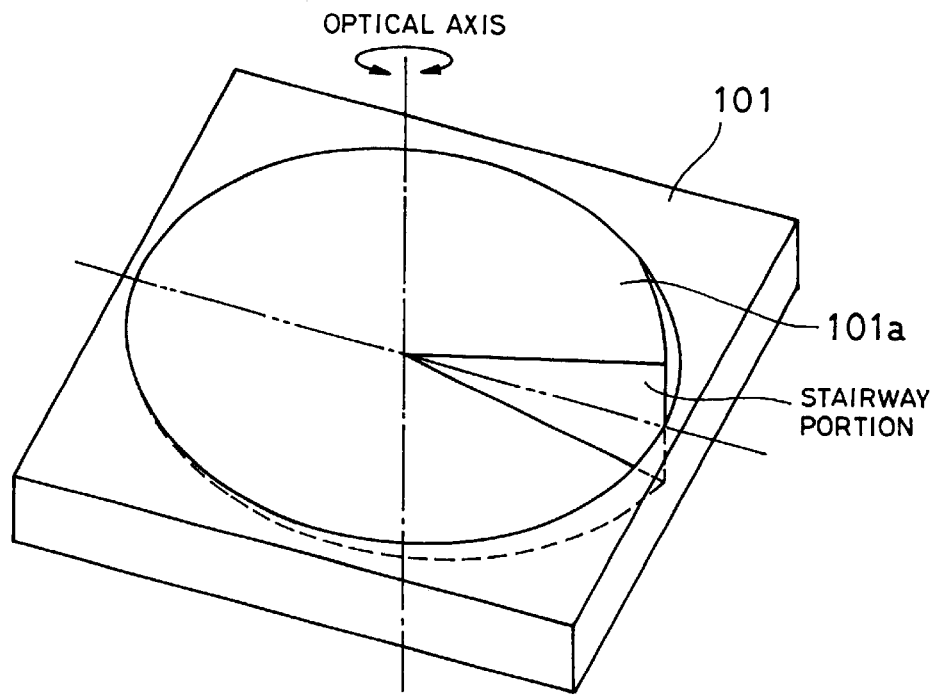
FIG. 14 is a schematic perspective view of a correcting plate of an aberration correcting apparatus in another embodiment of the optical pickup apparatus.

If a correcting plate in which the curved surface 101a of the first correcting plate 101 is widened to the optical axis to the center portion where a plate thickness change ratio around the optical axis shown in FIG. 3 is equal to 0 is used as shown in FIG. 14, the aberration near the optical axis can be more decreased.

Figure 15:
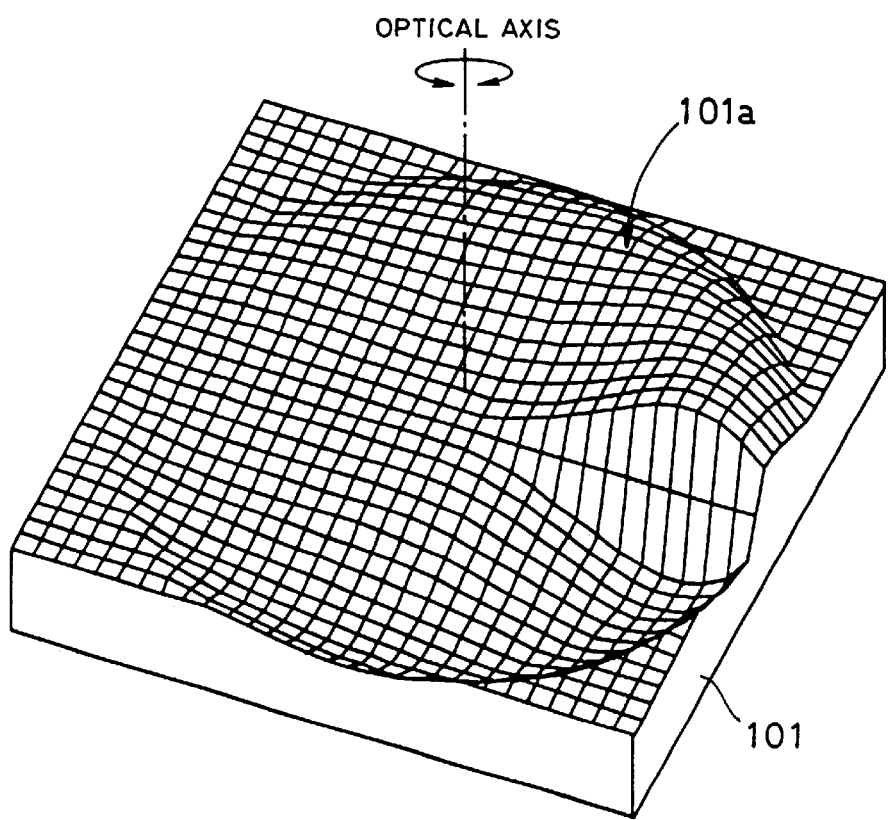
FIG. 15 is a schematic perspective view of a correcting plate of an aberration correcting apparatus in a further embociment of the optical pickup apparatus.
Figure 16:
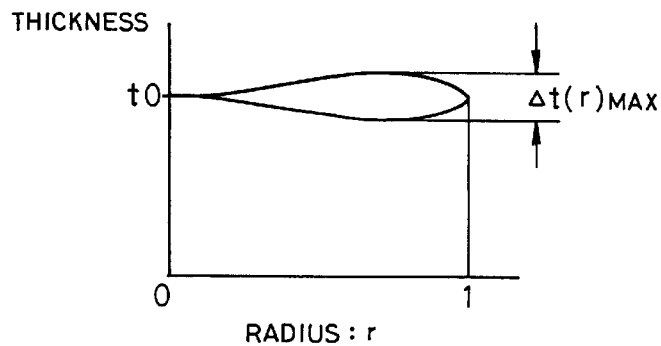
FIG. 16 is a graph showing a change in plate thickness on a radius vector of a first correcting plate of an aberration correcting apparatus in an optical pickup apparatus of the further embodiment.
Figure 17:
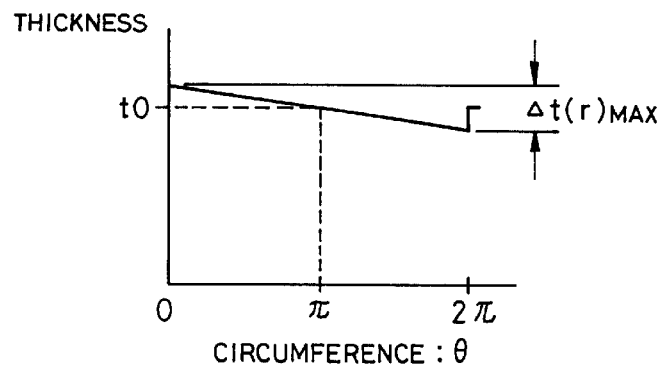
FIG. 17 is a graph showing a change in plate thickness on a circumference of the same radius of the first correcting plate of the aberration correcting apparatus in the optical pickup apparatus of the further embodiment.
Figure 18:
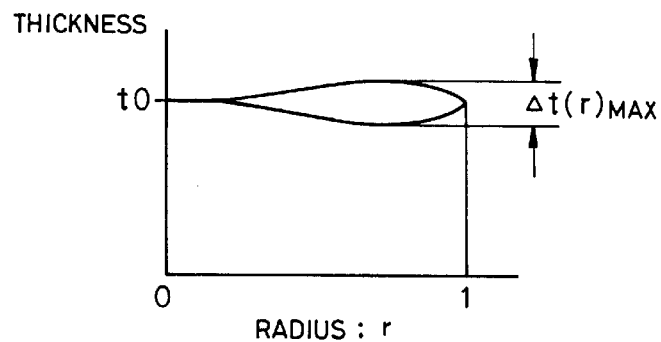
FIG. 18 is a graph showing a change in plate thickness on a radius vector of a second correcting plate of the aberration correcting apparatus in the optical pickup apparatus of the further embodiment.
Figure 19:
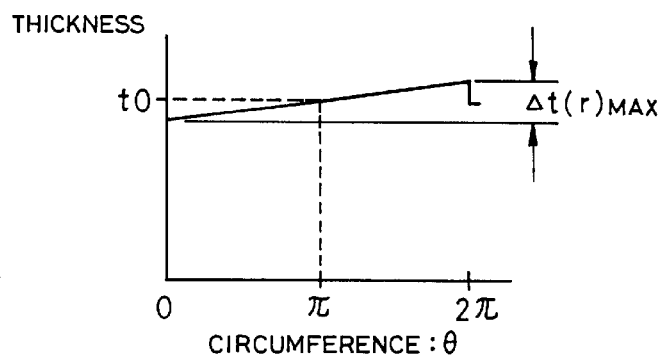
FIG. 19 is a graph showing a change in plate thickness on a circumference of the same radius of the second correcting plate of the aberration correcting apparatus in the optical pickup apparatus of the further embodiment.

Further, $\Delta t(r)$ can be also set so as to compensate the spherical aberration which is caused due to the optical disc thickness error shown in FIG. 11. That is, the correcting plate can be formed by a distribution such that the plate thickness of the curved surface gives a phase difference of a quartic aberration to the transmitted laser beam. For example, now assuming that a thickness of glass to correct an aberration of 2λ (λ: wavelength of a light source) is equal to about 0.6 μm and if the correcting plate is designed by a ray tracing method or the like so as to correct the glass thickness by rotating the plate at a rotational angle φ of 1°, Δt is equal to about 0.2 mm. By calculating Δt at each radius r from the aberration amount shown in FIG. 11, if the plate is rotated at the rotational angle φ of the first correcting plate 101 in accordance with the thickness error of the optical disc, an aberration correcting apparatus for correcting the quartic aberration and spherical aberration which are caused due to it can be manufactured. FIG. 15 shows a perspective view of the preferably designed first correcting plate 101. The plate is formed in a manner such that the plate thickness of the curved surface on the same radius vector from the optical axis of the first correcting plate 101 is proportional to a radial direction component of the phase deviation amount due to an aberration component which should be corrected and shown in FIG. 11 and symmetrical with respect to the optical axis. The preferable second correcting plate has a complementary shape on the curved surface 101a side of the first correcting plate 101 and is arranged so that the opposite flat surfaces of both plates are in parallel with each other so as to have a gap. FIGS. 16 and 18 are graphs showing the thicknesses of the preferable first and second correcting plates by polar coordinates in the radial direction, respectively. FIGS. 17 and 19 are graphs showing the thicknesses of the preferable first and second correcting plates by polar coordinates in the radial direction and the circumferential direction, respectively. Although the shape has been shown by handling only the component that is proportional to the power of 4 of the distance on the pupil in the embodiment, aberration components of high degrees can be similarly corrected by adding a component of a degree of an even number such as the power of 6, 8, or 10 of the distance on the pupil.

As described above, since the shape of the aberration correcting apparatus can be determined if the optical system to be compensated is determined, the apparatuses can be cheaply mass-produced by forming a die by using a precision NC finishing machine and by resin molding. For example, it is possible to construct a servo system such that one of the correcting plates is attached to a rotary actuator, the actuator is driven on the basis of a detected spherical aberration amount or an optical disc thickness error amount signal, and the spherical aberration is always suppressed. Since an actuator which operates at a frequency of up to a high frequency can be used, a signal can be preferably reproduced even if an optical disc with a shape such that the thickness of the optical disc fluctuates many times in one circumference or an optical disc such that a scratched portion was polished and repaired is used. This servo can be also realized by using a method whereby a quality such as amplitude, jitter, or the like of the signal is monitored and the servo is controlled so as to always obtain the best signal.

The invention can be also applied to a case of reproducing an optical disc having a multilayer structure or a case of reproducing an optical disc having a different standard of the optical disc thickness.

Figure 20:
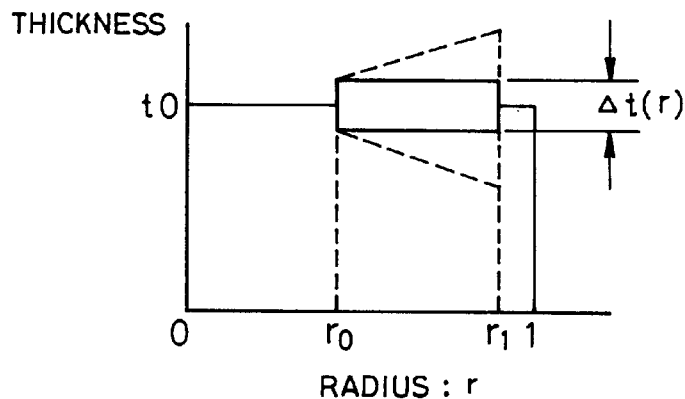
FIG. 20 is a graph showing a change in plate thickness on the radius vector of the second correcting plate of the aberration correcting apparatus in a further embodiment of the optical pickup apparatus.
Figure 21:
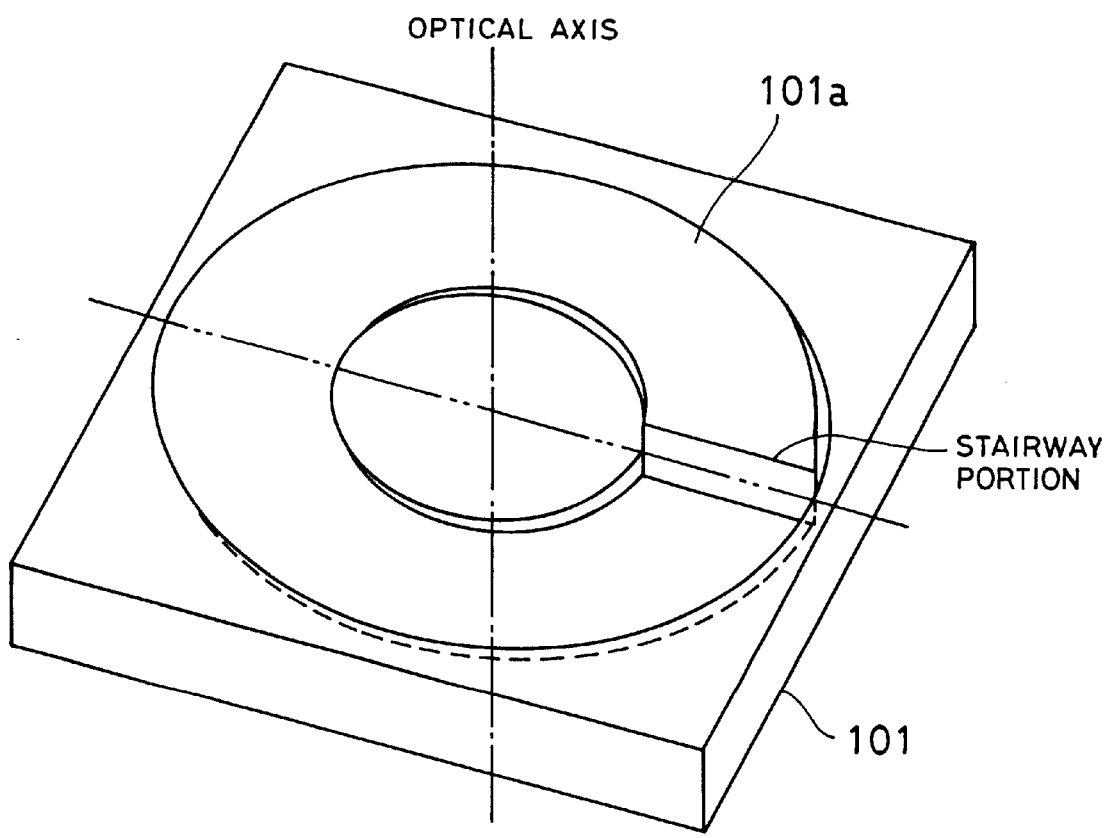
FIG. 21 is a schematic perspective view of a correcting plate of an aberration correcting apparatus in an optical pickup apparatus of the further embodiment.

Although the shape of the curved surface of the correcting plate has been determined so as to accurately remove the generated aberration in the preferred embodiment, for example, a change in plate thickness in the radial direction can be approximated by a shape such as to have a predetermined value in a certain radial interval as shown in FIG. 20. If the plate thickness of the curved surface is set to be constant on the same radius vector in which the optical axis is set to the center, as for the correction amount corresponding to a broken line portion shown in FIG. 20, although the aberration amount which corresponds to the peaks of the curve shown in FIG. 13 remain is large, the surface shape is simple as shown in FIG. 21 and the correcting plate can be easily manufactured.

Figure 22:
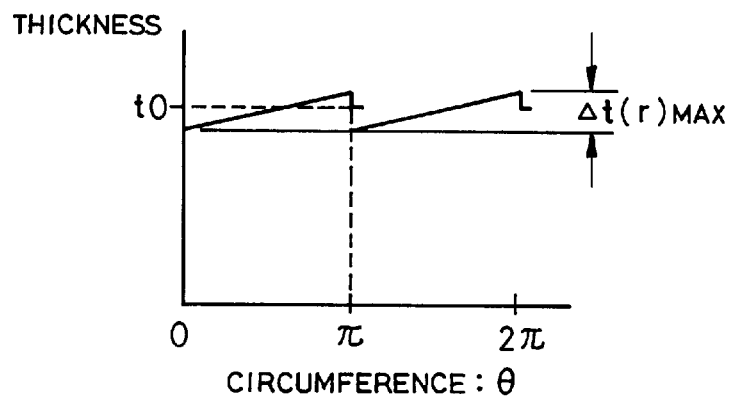
FIG. 22 is a graph showing a change in plate thickness on a circumference of the same radius of the correcting plate of the aberration correcting apparatus in a further embodiment of the optical pickup apparatus.
Figure 23:
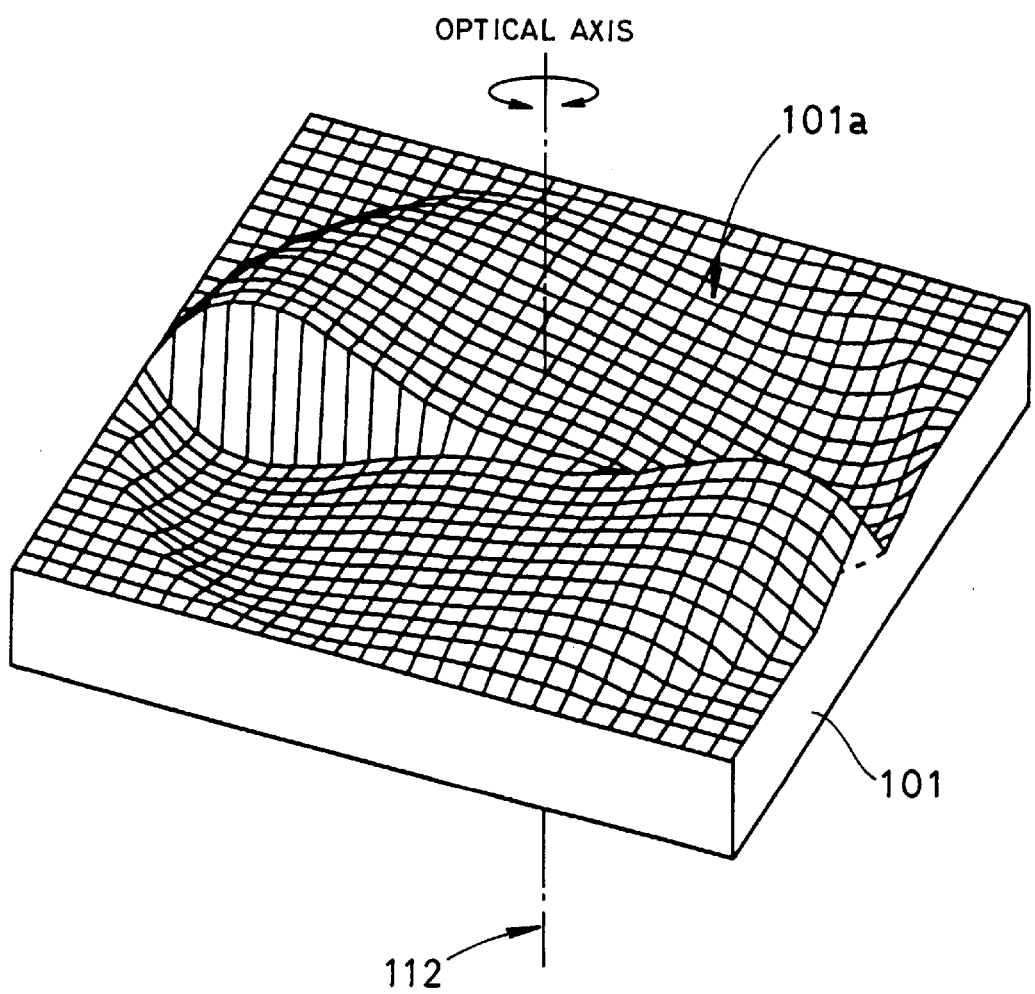
FIG. 23 is a schematic perspective view of the correcting plate of the aberration correcting apparatus in the optical pickup apparatus of the further embodiment.

Although the construction such that the plate thickness changes on the circumference of the same radius has been shown in the embodiment, it is also possible to change the plate thickness twice on the circumference of the same radius and divide the curved surface as shown in FIGS. 22 and 23. In the case of dividing the curved surface at two positions, by making the dividing positions correspond to the radial direction of the disc, an error of a tracking error signal which is caused due to the dividing positions and multiplexed to the tracking error signal can be eliminated. The number of times of division of the curved surfaces of the first and second correcting plates is not limited to 2 but can be arbitrarily set to 3, 4, or the like. According to the embodiment, since the surface shape of the aberration correcting plate can be designed so as to be close to the flat surface than that in the first embodiment, namely, since the stairway portion can be designed to be lower, the correcting plate can be easily formed. Since the correcting plate is supported to be driven to rotate about the axis of rotation 112, a displacement or a surface oscillation upon driving can be suppressed to a small value and good performance can be obtained.

Figure 24:
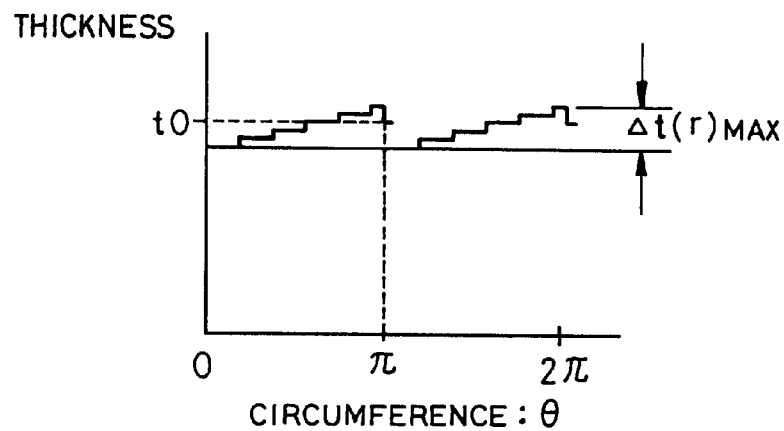
FIG. 24 is a graph showing a change in plate thickness on a circumference of the same radius of the correcting plate of the aberration correcting apparatus in a further embodiment of the optical pickup apparatus.

Although the shape of the curved surface of the correcting plate has been determined to be the smooth shape so as to accurately remove the generated aberration in the embodiment, as shown in FIG. 24, an inclined portion of the curved surface of the correcting plate can be constructed by substituting straight lines of a few steps for it. The surface shape of the correcting plate can be also constructed by using an etching method or the like, for example, by a flat surface with several steps, namely, by a stairway-like flat surface. By setting the thickness of the correcting plate to a stairway-like shape, in other words, by gradually decreasing or increasing it, a hologram sheet manufacturing process can be used and the aberration correcting plate can be easily formed. It is also possible to construct the apparatus so as to have a plurality of functions by, for example, synthesizing with another hologram pattern known as a pattern for tracking error generation or the like.

Since the inclination angle of the surface is small in the embodiment, an adverse influence by an air gap that is caused between the first and second correcting plates 101 and 102 is small. In the case of correcting a larger spherical aberration, in an application such that a correction of high precision is necessary, or the like, however, the apparatus can be constructed so as to fill the gap portion with a flow transparent medium such as an index matching oil or the like whose refractive index differs from that of the light transmitting substrate. With this construction, the influence by the gap can be reduced.

According to the invention, the apparatus can be also constructed so as to have a function of a collimator lens or the like by constructing the first and second correcting plates 101 and 102 in a manner such that the surfaces 101b and 102b on the side where they do not face are set to lenses each having a radius of curvature instead of the flat surfaces. The apparatus can be also constructed so as to have a function such as generation of a servo signal, division of the beam, or the like by forming the non-opposite surfaces on the outside by a hologram. The apparatus can be also constructed in a manner such that the non-opposite surface on the outside of one of the correcting plates is set to a reflecting surface and a phase difference is given to the light which reciprocates in the aberration correcting apparatus. In this case, the shape of each curved surface can be arbitrarily set in accordance with a distribution shape of the phase difference to be added in the optical system.

In the first embodiment, the refractive indices of the two light transmitting substrates are made identical and a change in optical path length is caused by changing the thickness of correcting plate. If a construction such that an optical path difference similar to that in the embodiment is caused is used, however, correcting plates having different refractive indices can be used as a second embodiment. That is, a distribution of the optical path lengths can be set to a distribution of the complementary refractive indices provided for each of the parallel flat correcting plates. When using a pickup apparatus in which a change in light source wavelength is absorbed by using materials of different dispersion states of two or more light sources of different wavelengths are provided, it is possible to similarly use various methods which are used in designing of lenses such that an effect is particularly typically presented in the case of one wavelength.

Figure 25:
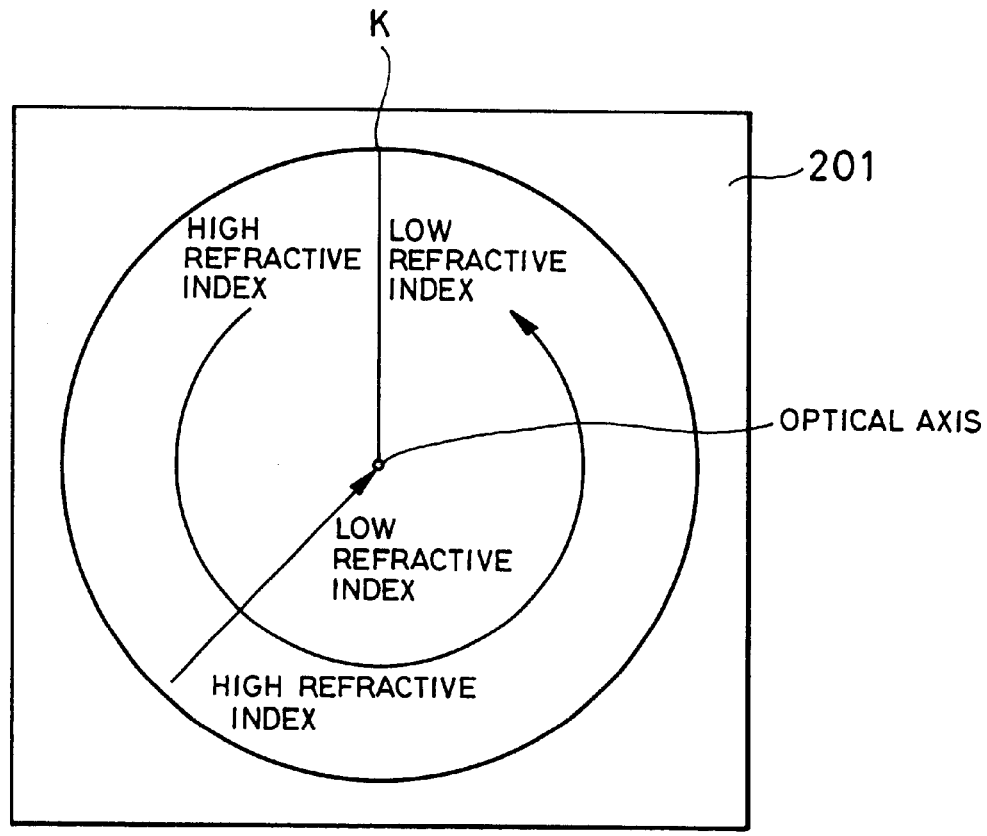
FIG. 25 is a schematic plan view of the first correcting plate of the aberration correcting apparatus in the optical pickup apparatus of the further embodiment.
Figure 26:
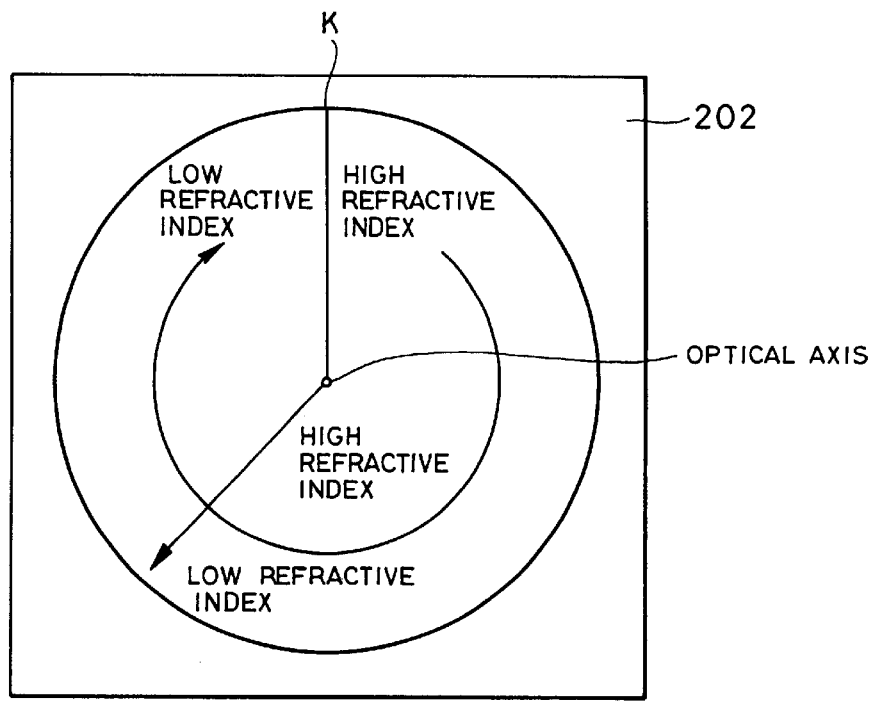
FIG. 26 is a schematic plan view of the second correcting plate of the aberration correcting apparatus in the optical pickup apparatus of the further embodiment.

FIGS. 25 and 26 show a first correcting plate 201 and a second correcting plate 202 which face each other with a distance and have mutually complementary high and low refractive index distributions. An area of the high and refractive index and an area of the low refractive index continuously extend, respectively, in the concentric direction in which a boundary K extending from the optical axis is set to a border. In the first and second correcting plates 201 and 202, therefore, the distribution of the refractive indices is gradually decreased or increased on the circumference of the same radius in which the optical axis is set to the center. The distribution of the refractive indices is gradually decreased or increased on the same radius vector from the optical axis. Further, the distribution of the refractive indices can be also made constant on the same radius vector.

Figure 27:
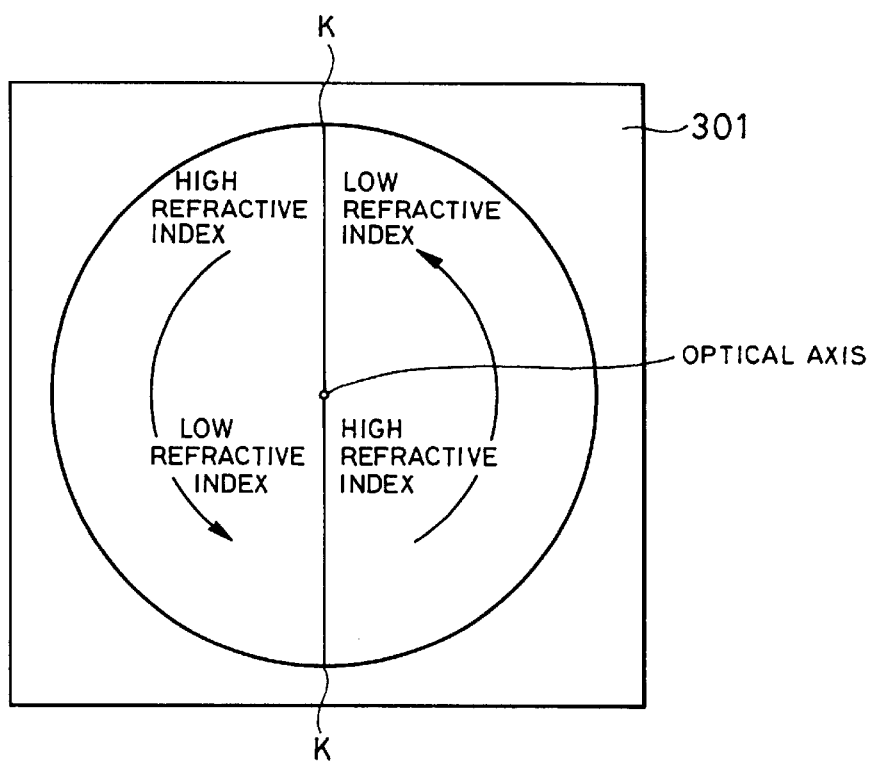
FIG. 27 is a schematic plan view of the second correcting plate of the aberration correcting apparatus in a further embodiment of the optical pickup apparatus.

As shown in FIG. 27, the number of boundaries K in the refractive index change area extending from the optical axis is set to 2 instead of 1 and the high and low refractive indices are changed twice on the circumference of the same radius similar to those shown in FIGS. 22 and 23, so that the distribution of the refractive indices to change the optical path length can be divided.

Figure 28:
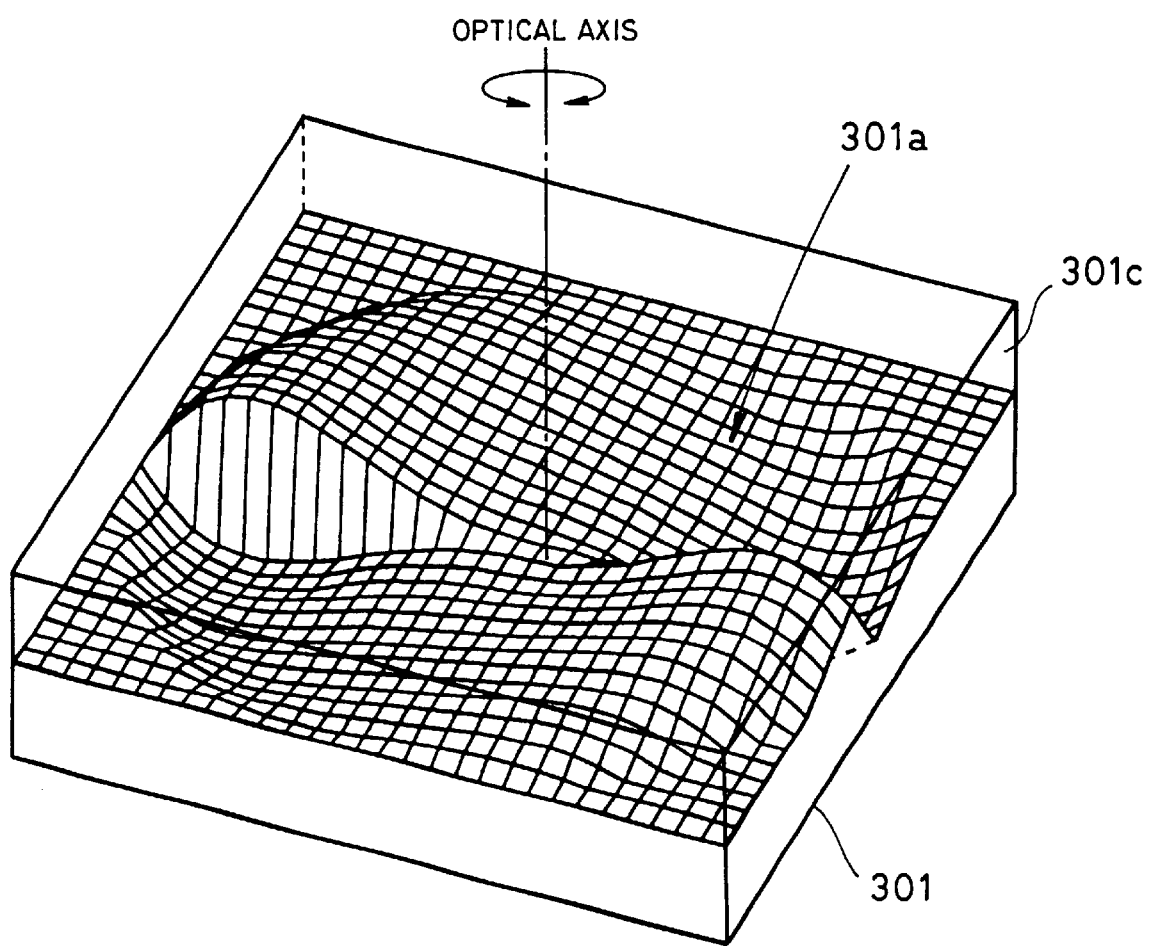
FIG. 28 is a schematic perspective view of the correcting plate of the aberration correcting apparatus in a further embodiment of the optical pickup apparatus.

A method of making a distribution refractive index lens can be used as a method of making the parallel flat correcting plates having complementary refractive index distributions. A multicomponent glass, a porous glass, or the like is used as a material of the correcting plate and those plates can be formed by an ion exchanging method, a CVD method, or the like. As shown in FIG. 28, a material 301c whose refractive index differs from that of the substrate is deposited onto a transparent substrate 301 on which a predetermined curved surface 301a has been formed in a manner such that the whole material 301c becomes a parallel flat plate, so that it is possible to form an accurate refractive index distribution, for example, a refractive index distribution that is proportional to the radial direction component of the phase deviation amount from the optical axis due to the aberration components which should be corrected and are symmetrical on the same radius vector such as to apply a phase difference of quartic aberration to the transmitted laser beam.

Although the pickup apparatus which is used for recording and reproduction of the optical disc has been described as an example in the embodiment, the invention is not limited to this apparatus but can be applied to various optical apparatuses which need correction of the spherical aberration such as microscope apparatus, astronomical telescope, and the like. In this case, it is also possible to use a simple construction such that the aberration is manually adjusted without automatically controlling a movement amount of the aberration correcting plate.

In the invention, in order to minimize the spherical aberration which is applied to the laser beam which transmits the transparent substrate of the optical disc, the curved surfaces of the correcting plates are constructed so that the complementary curved surfaces of the complementary shapes have the relation such that the inclinations on the circumference of the same radius from the optical axis are always equal. The correcting plates are overlaid and arranged with a distance so as not to be come into contact with each other by setting their optical axes to a common axis. Further, at least one of the correcting plates is rotatable around the optical axis only by a predetermined distance, so that the spherical aberration can be corrected accurately at a high speed by the rotation of the small number of parts. Even in a system using an objective lens of a high numerical aperture, a thickness error permission range of the optical disc substrate can be widened and the system with a high margin can be constructed. The invention can be also used in order to be applicable to systems where designed substrate thicknesses are different from each other like a DVD and a CD, for example. Since information can be recorded at a high density through the relatively thick light transmitting substrate, it is possible to realize a video optical disc system or the like in which the performance is hardly deteriorated by scratches or foul of the optical disc.

What is claimed is:

1. An aberration correcting apparatus which is arranged on an optical axis of an optical path in an optical apparatus, wherein
    said aberration correcting apparatus comprises a pair of light transmitting substrates each of which is arranged so as to intersect perpendicularly to the optical axis, wherein at least one of said light transmitting substrates is held to be rotatable about said optical axis,
    said light transmitting substrates have distributions of optical path lengths which mutually complementarily decrease or increase in a predetermined range on a concentric circle in which said optical axis is set to a center, and
    a distribution of the total optical path length of said pair of light transmitting substrates is changed uniformly within a predetermined range on the concentric circle in which said optical axis is set to the center in accordance with the rotation of said light transmitting substrate, thereby applying a phase difference to a transmitted light beam.

2. An apparatus according to claim 1, wherein said pair of light transmitting substrates have mutually complementary thicknesses, and the thickness of each of said light transmitting substrates gradually decreases or increases in a predetermined range on a circumference of a same radius in which said optical axis is set to the center.

3. An apparatus according to claim 2, wherein the thickness of each of said light transmitting substrates gradually decreases or increases on a same radius vector from said optical axis.

4. An apparatus according to claim 3, wherein the surfaces of said light transmitting substrates form mutually complementary curved surfaces so that the total thickness of said pair of light transmitting substrates is proportional to a phase deviation amount to be corrected.

5. An apparatus according to claim 4, wherein said pair of light transmitting substrates provide a quartic phase difference onto the same radius vector from said optical axis of the transmitted light beam.

6. An apparatus according to claim 5, wherein said light transmitting substrates have mutually complementary distributions of refractive indices so that the total distribution of said refractive indices of said pair of light transmitting substrates is proportional to a phase deviation amount to be corrected.

7. An apparatus according to claim 6, wherein a transparent flow medium whose refractive index differs from that of the light transmitting substrate is filled in a gap between said pair of light transmitting substrates.

8. An apparatus according to claim 5, wherein a transparent flow medium whose refractive index differs from that of the light transmitting substrate is filled in a gap between said pair of light transmitting substrates.

9. An apparatus according to claim 4, wherein a transparent flow medium whose refractive index differs from that of the light transmitting substrate is filled in a gap between said pair of light transmitting substrates.

10. An apparatus according to claim 3, wherein said pair of light transmitting substrates provide a quartic phase difference onto the same radius vector from said optical axis of the transmitted light beam.

11. An apparatus according to claim 10, wherein said light transmitting substrates have mutually complementary distributions of refractive indices so that the total distribution of said refractive indices of said pair of light transmitting substrates is proportional to a phase deviation amount to be corrected.

12. An apparatus according to claim 11, wherein a transparent flow medium whose refractive index differs from that of the light transmitting substrate is filled in a gap between said pair of light transmitting substrates.

13. An apparatus according to claim 10, wherein a transparent flow medium whose refractive index differs from that of the light transmitting substrate is filled in a gap between said pair of light transmitting substrates.

14. An apparatus according to claim 3, wherein a transparent flow medium whose refractive index differs from that of the light transmitting substrate is filled in a gap between said pair of light transmitting substrates.

15. An apparatus according to claim 2, wherein the thickness of each of said light transmitting substrates is constant within a predetermined range on a same radius vector in which said optical axis is set to the center.

16. An apparatus according to claim 15, wherein a transparent flow medium whose refractive index differs from that of the light transmitting substrate is filled in a gap between said pair of light transmitting substrates.

17. An apparatus according to claim 2, wherein a transparent flow medium whose refractive index differs from that of the light transmitting substrate is filled in a gap between said pair of light transmitting substrates.

18. An apparatus according to claim 1, wherein a refractive index of each of said light transmitting substrates is distributed so as to gradually decrease or increase in a predetermined range on a circumference of a same radius in which said optical axis is set to the center.

19. An apparatus according to claim 18, wherein the distribution of said refractive indices gradually decreases or increases on a same radius vector from said optical axis.

20. An apparatus according to claim 19, wherein the distribution of said refractive indices of each of said light transmitting substrates is constant on the same radius vector in which said optical axis is set to the center.

21. An apparatus according to claim 20, wherein a transparent flow medium whose refractive index differs from that of the light transmitting substrate is filled in a gap between said pair of light transmitting substrates.

22. An apparatus according to claim 19, wherein a transparent flow medium whose refractive index differs from that of the light transmitting substrate is filled in a gap between said pair of light transmitting substrates.

23. An apparatus according to claim 18, wherein said pair of light transmitting substrates provide a quartic phase difference onto the same radius vector from said optical axis of the transmitted light beam.

24. An apparatus according to claim 23, wherein said light transmitting substrates have mutually complementary distributions of refractive indices so that the total distribution of said refractive indices of said pair of light transmitting substrates is proportional to a phase deviation amount to be corrected.

25. An apparatus according to claim 24, wherein a transparent flow medium whose refractive index differs from that of the light transmitting substrate is filled in a gap between said pair of light transmitting substrates.

26. An apparatus according to claim 23, wherein a transparent flow medium whose refractive index differs from that of the light transmitting substrate is filled in a gap between said pair of light transmitting substrates.

27. An apparatus according to claim 18, wherein a transparent flow medium whose refractive index differs from that of the light transmitting substrate is filled in a gap between said pair of light transmitting substrates.

28. An apparatus according to claim 1, wherein a transparent flow medium whose refractive index differs from that of the light transmitting substrate Is filled in a gap between said pair of light transmitting substrates.

29. An optical pickup apparatus which writes or reads out a signal to/from an optical disc and has a light source for emitting a laser beam, an objective lens for converging the laser beam toward an information recording surface of said optical disc, an irradiating optical system for leading said laser beam to said objective lens, and a detection optical system which includes photodetecting means and leads reflection light from said information recording surface to said photodetecting means through said objective lens, wherein said optical pickup apparatus comprises:

an aberration correcting apparatus which is arranged on an optical axis of an optical path of said irradiating optical system and comprises a pair of light transmitting substrates that face each other, whrein at least one of said light transmitting substrates is held rotatably around said optical axis, the light transmitting substrates have distributions of optical path lengths which mutually complementarily and gradually decrease or increase on a circumference of a same radius in which said optical axis is set to a center, and a distribution of the total optical path length of said pair of light transmitting substrates is changed uniformly within a predetermined range on the concentric circle in which said optical axis is set to the center in accordance with the rotation of said light transmitting substrate, thereby applying a phase difference to the transmitted laser beam; and aberration correction driving means which includes optical disc thickness detecting means for generating an output corresponding to a thickness change amount of said optical disc, rotates said light transmitting substrate in accordance with said output, and minimizes a spherical aberration that is given to the transmitted laser beam by the transparent substrate of said optical disc.

* * * * *